United States Patent
Menon et al.

(10) Patent No.: US 11,892,052 B2
(45) Date of Patent: Feb. 6, 2024

(54) TEMPERATURE COMPENSATED SHOCK STRUT VISUAL HEALTH INDICATOR SYSTEMS AND METHODS

(71) Applicant: GOODRICH CORPORATION, Charlotte, NC (US)

(72) Inventors: Vishal Sreekumar Menon, Kerala (IN); Basavaraj Bodki, Bangalore (IN); Jason Bradley Allen, Waco, TX (US); Adam J. Ditzler, Fort Worth, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/848,164

(22) Filed: Jun. 23, 2022

(65) Prior Publication Data

US 2023/0358290 A1  Nov. 9, 2023

(30) Foreign Application Priority Data

May 6, 2022  (IN) .............................. 202241026395

(51) Int. Cl.
*B64C 25/60* (2006.01)
*F16F 9/32* (2006.01)
*F16F 9/38* (2006.01)

(52) U.S. Cl.
CPC .............. *F16F 9/3264* (2013.01); *F16F 9/38* (2013.01); *B64C 25/60* (2013.01); *F16F 2222/02* (2013.01)

(58) Field of Classification Search
CPC . B64C 25/60; F16F 9/38; F16F 9/3264; F16F 2222/02
See application file for complete search history.

(56) References Cited

U.S. PATENT DOCUMENTS 3,652,040 A * 3/1972 Hartel .................... B64C 25/60
177/141
4,092,947 A   6/1978 Labrecque
(Continued)

FOREIGN PATENT DOCUMENTS

CA     2700546     11/2015
CN   110949677     4/2020

OTHER PUBLICATIONS

European Patent Office, European Search Report dated Sep. 13, 2023 in Application No. 23171837.0.

*Primary Examiner* — Thomas W Irvin
(74) *Attorney, Agent, or Firm* — SNELL & WILMER L.L.P.

(57) ABSTRACT

A temperature compensating shock strut health indicator system for use with a shock strut comprises a visual indicator comprising a plurality of sectors and a pointer configured to rotate with respect to the visual indicator to point to one of the plurality of sectors. The sector to which the pointer points to is dependent on the shock strut stroke (i.e., the position of the piston with respect to the cylinder). In various embodiments, the visual indicator includes various rings that correspond to a different temperature compensated ideal stroke whereby a crew member can correspond the pointer to the appropriate ring depending on ambient temperature. In various embodiments, the pointer comprises a temperature sensitive material configured to cause the pointer to rotate with respect to the visual indicator to actively compensate for temperature.

19 Claims, 14 Drawing Sheets

(56) References Cited

U.S. PATENT DOCUMENTS

| | | | |
|---|---|---|---|
| 7,274,309 B2 * | 9/2007 | Nance | B64D 45/00 340/960 |
| 7,274,310 B1 * | 9/2007 | Nance | B64C 25/60 340/960 |
| 8,042,765 B1 * | 10/2011 | Nance | B64D 45/0005 244/100 R |
| 8,070,095 B2 | 12/2011 | Luce et al. | |
| 8,616,146 B2 | 12/2013 | Martin et al. | |
| 8,939,400 B2 * | 1/2015 | Mellor | B64C 25/62 244/102 R |
| 9,045,237 B2 | 6/2015 | Nance | |
| 9,499,280 B2 * | 11/2016 | Mellor | B64C 25/00 |
| 9,771,166 B2 * | 9/2017 | Wilson | G01M 17/04 |
| 10,752,278 B2 * | 8/2020 | Canas | F16F 1/041 |
| 11,091,252 B2 * | 8/2021 | Ning | B64C 25/34 |
| 11,104,450 B2 * | 8/2021 | Stein | F16F 9/3264 |
| 2006/0284008 A1 * | 12/2006 | Nance | B64D 45/00 244/100 R |
| 2010/0288878 A1 * | 11/2010 | Bennett | B64C 25/34 702/50 |
| 2012/0211600 A1 * | 8/2012 | Mellor | B64C 25/62 244/100 R |
| 2015/0166195 A1 * | 6/2015 | Wilson | G01L 9/0089 244/100 R |
| 2015/0344150 A1 * | 12/2015 | Duncan | F16B 1/00 267/195 |
| 2017/0233096 A1 | 8/2017 | Clarke | |
| 2018/0216988 A1 * | 8/2018 | Nance | B64C 25/001 |
| 2019/0291768 A1 * | 9/2019 | Canas | F16F 1/041 |
| 2019/0344904 A1 * | 11/2019 | Stein | B64D 45/0005 |
| 2019/0376576 A1 | 12/2019 | Fazeli et al. | |
| 2020/0307824 A1 | 10/2020 | Georgin | |

* cited by examiner

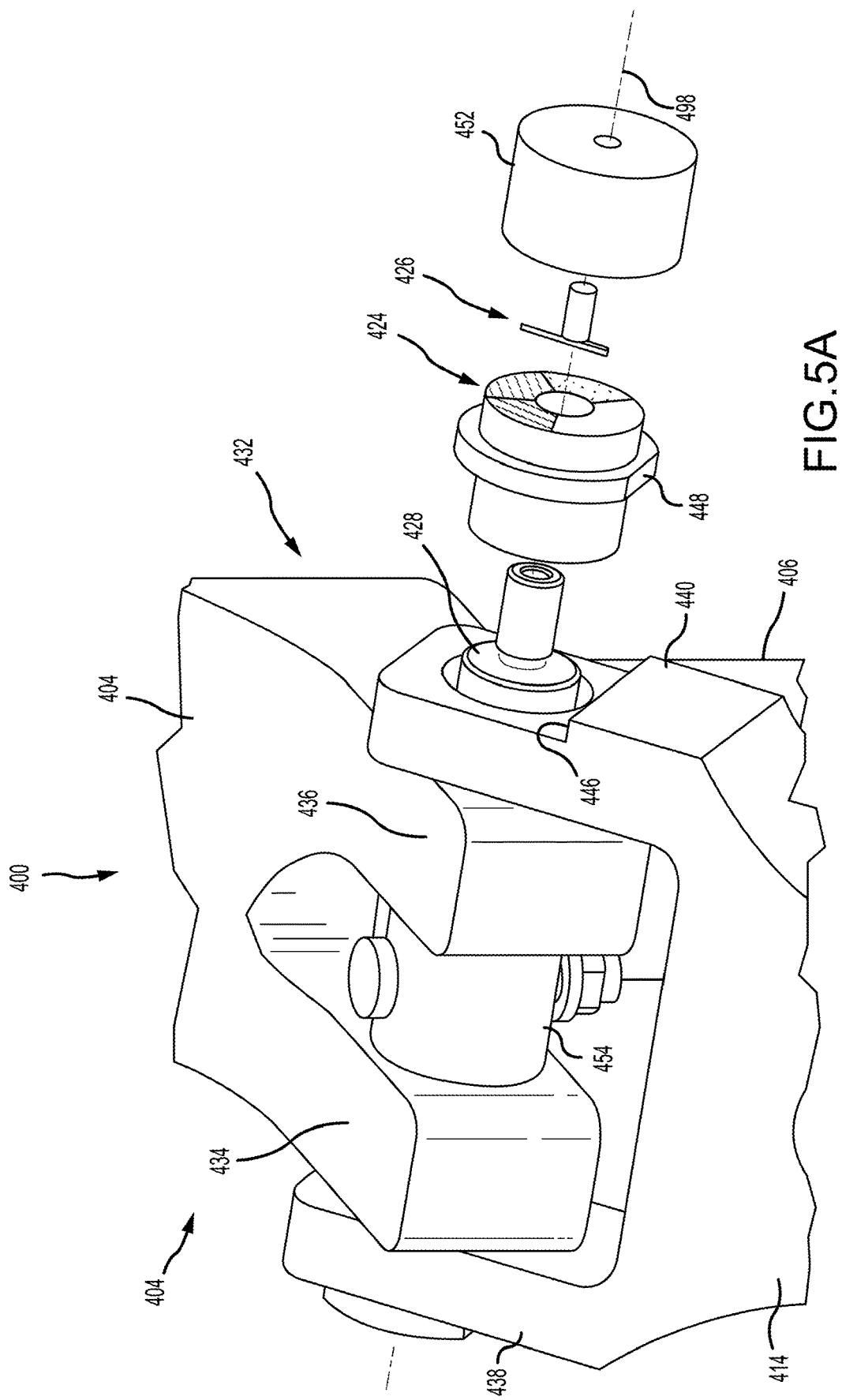

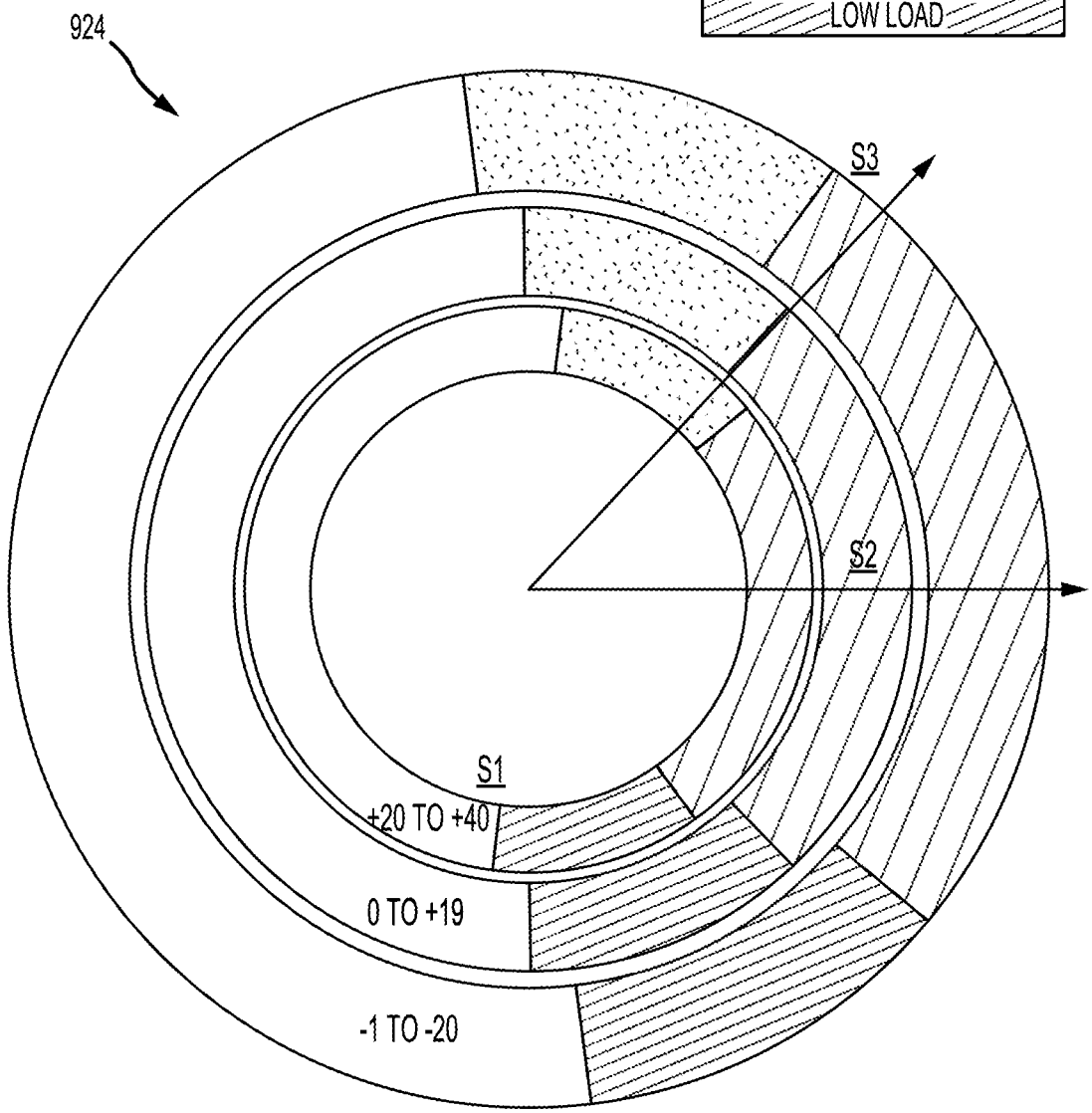
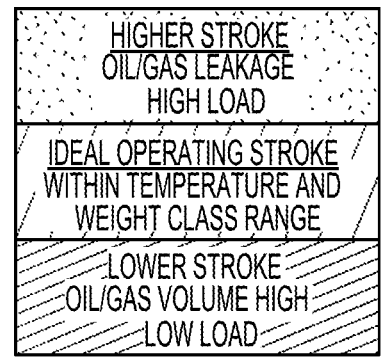
FIG.13
FIG.12

| TEMPERATURE (°C) | AC Wt 1 STROKE (IN) | AC Wt 2 STROKE (IN) | AC Wt 3 STROKE (IN) |
|---|---|---|---|
| +20 TO +40 | S1 | S2 | S3 |
| 0 TO +19 | S4 | S5 | S6 |
| -1 TO -20 | S7 | S8 | S9 |

TEMPERATURE COMPENSATED SHOCK STRUT VISUAL HEALTH INDICATOR SYSTEMS AND METHODS

CROSS-REFERENCE TO RELATED APPLICATIONS

This application claims priority to, and the benefit of, India Patent Application No. 202241026395, filed May 6, 2022, and titled "TEMPERATURE COMPENSATED SHOCK STRUT VISUAL HEALTH INDICATOR SYSTEMS AND METHODS," which is incorporated by reference herein in its entirety for all purposes.

FIELD

The present disclosure relates to landing gear of aircraft and, more particularly, to health indicators for landing gear.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Functionality and performance of a landing gear shock strut depends on internal gas and oil levels. Gas pressure and oil volume may be maintained within a design envelope to ensure that the landing gear functionality is within an acceptable range.

SUMMARY

Disclosed herein is a system for use with a shock strut, the system comprising a visual indicator which is visible from an exterior of the shock strut, and a pointer. At least one of the pointer or the visual indicator is configured to rotate with respect to the other of the pointer or the visual indicator in response to a piston of the shock strut translating with respect to a cylinder of the shock strut.

In various embodiments, the visual indicator comprises a plurality of sectors, wherein the pointer is configured to point to a sector of the plurality of sectors based upon a stroke of the shock strut to indicate a health of the shock strut.

In various embodiments, the visual indicator comprises a plurality of concentric rings, each corresponding to a different ambient temperature, and each comprising a plurality of sectors corresponding to a different weight supported by the shock strut.

In various embodiments, the system further comprises a pin, the visual indicator comprises a bushing configured to be placed over the pin, and the pointer is configured to be mounted to the pin. In various embodiments, the pin is configured to be received by a torque arm whereby the torque arm is mounted to a cylinder of the shock strut. In various embodiments, the pin comprises a slot configured to accommodate temperature compensating rotation of the pointer.

In various embodiments, the system further comprises a spacer configured to receive the pin, wherein the spacer is configured to stop the pin from at least one of an axial movement or a rotational movement.

In various embodiments, the system further comprises a transparent cover configured to be coupled to the visual indicator to at least partially enclose the pointer, and the visual indicator is visible through the transparent cover.

In various embodiments, the visual indicator comprises a plurality of concentric rings, each corresponding to a different ambient temperature, wherein a ring of the plurality of concentric rings comprises a thermal sensitive paint configured to change color when an ambient temperature is within a temperature range of the ring to indicate visually that the ambient temperature corresponds to the temperature range of the ring.

A system for use with a shock strut is disclosed, the system comprising a pin, a visual indicator comprising a plurality of sectors, wherein the visual indicator is visible from an exterior of the shock strut, a pointer configured to rotate with respect to the visual indicator to point to one of the plurality of sectors, a pointer case, a spindle mounted to the pointer case, and a temperature sensitive material contained within the pointer case, wherein the temperature sensitive material is configured to move in response to a change in temperature to cause the pointer to rotate with respect to the visual indicator.

In various embodiments, the pin is configured to be received by a torque arm whereby the torque arm is mounted to a cylinder of the shock strut.

In various embodiments, the pin comprises a pin slot configured to accommodate temperature compensating rotation of the pointer.

In various embodiments, the temperature sensitive material comprises a bi-metallic coil, wherein the bi-metallic coil is configured to cause the spindle to rotate in response to the change in temperature, and the pointer rotates with the spindle.

In various embodiments, the temperature sensitive material comprises a fluid, wherein the fluid is configured to expand and/or contract to translate the spindle with respect to the pointer case in response to a change in temperature, and the pointer is configured to rotate in response to the spindle translating with respect to the pointer case.

In various embodiments, the pointer is configured to be mounted to through the pin slot and the pointer case is configured to be mounted to the pin.

In various embodiments, the system further comprises a cam body. In various embodiments, the cam body translates linear motion of the spindle into rotational motion of the cam body, and the pointer rotates with the cam body with respect to the visual indicator. In various embodiments, the cam body translates linear motion of the spindle into rotational motion of the spindle, and the pointer rotates with the spindle with respect to the visual indicator.

In various embodiments, the system further comprises a spring element configured to provide a return force for the spindle as the fluid contracts in response to the change in temperature.

In various embodiments, the system further comprises a transparent cover coupled to the visual indicator and at least partially enclosing the pointer.

In various embodiments, the pointer case extends from the transparent cover and is exposed to an ambient air.

A shock strut is disclosed, comprising a cylinder, a piston configured to be at least partially received by the cylinder, a torque arm coupled between the cylinder and the piston via a pivot, a visual indicator disposed at the pivot, wherein the visual indicator is visible from an exterior of the shock strut, and a pointer. At least one of the pointer or the visual indicator is configured to rotate with respect to the other of the pointer or the visual indicator in response to the piston translating with respect to the cylinder.

In various embodiments, the torque arm is configured to rotate with respect to at least one of the cylinder or the piston in response to the piston translating with respect to the cylinder, and the at least one of the pointer or the visual indicator is configured to rotate together with the torque arm.

In various embodiments, the visual indicator comprises a contact surface configured to prevent the visual indicator from rotating with the pointer.

In various embodiments, the pivot comprises a pin, and the pointer is mounted to the pin.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 5A illustrates an assembly view of a landing gear with a system for visually indicating a health of the shock strut, the system installed at the pivot whereby the upper torque arm mounts to the cylinder, the system comprising a visual indicator that rotates with the torque arm, in accordance with various embodiments;

FIG. 12 illustrates an exemplary front face label for a visual indicator which includes a plurality of rings, each corresponding to a load versus stroke curve for a different temperature range, in accordance with various embodiments;

FIG. 13 illustrates a table including a temperature range and a stroke range which corresponds to different sectors of the visual indicator of FIG. 12, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Temperature compensating shock strut health visual indicator systems of the present disclosure, in various embodiments, allow for a crew member to determine shock strut health with a quick visual check of a visual indicator mounted to the shock strut. In various embodiments, the visual indicator comprises a temperature compensating pointer assembly which adjusts the location of a pointer based on the ambient temperature to provide a temperature compensated reading of the shock strut health (active temperature compensation). In various embodiments, the visual indicator comprises a multi banded (e.g., multi ringed) visual indicator with temperature compensated sectors adjusted for temperature to provide a temperature compensated reading of the shock strut health (passive temperature compensation).

Temperature compensating shock strut health visual indicator systems of the present disclosure may offer a preliminary health check for the shock strut servicing. Temperature compensating shock strut health visual indicator systems of the present disclosure may be used to indicate loading conditions through stroke measurements along with active and/or passive temperature compensations techniques. Temperature compensating shock strut health visual indicator systems of the present disclosure may be retrofitted into existing shock struts. Temperature compensating shock strut health visual indicator systems of the present disclosure may be weight efficient.

Figure 1:
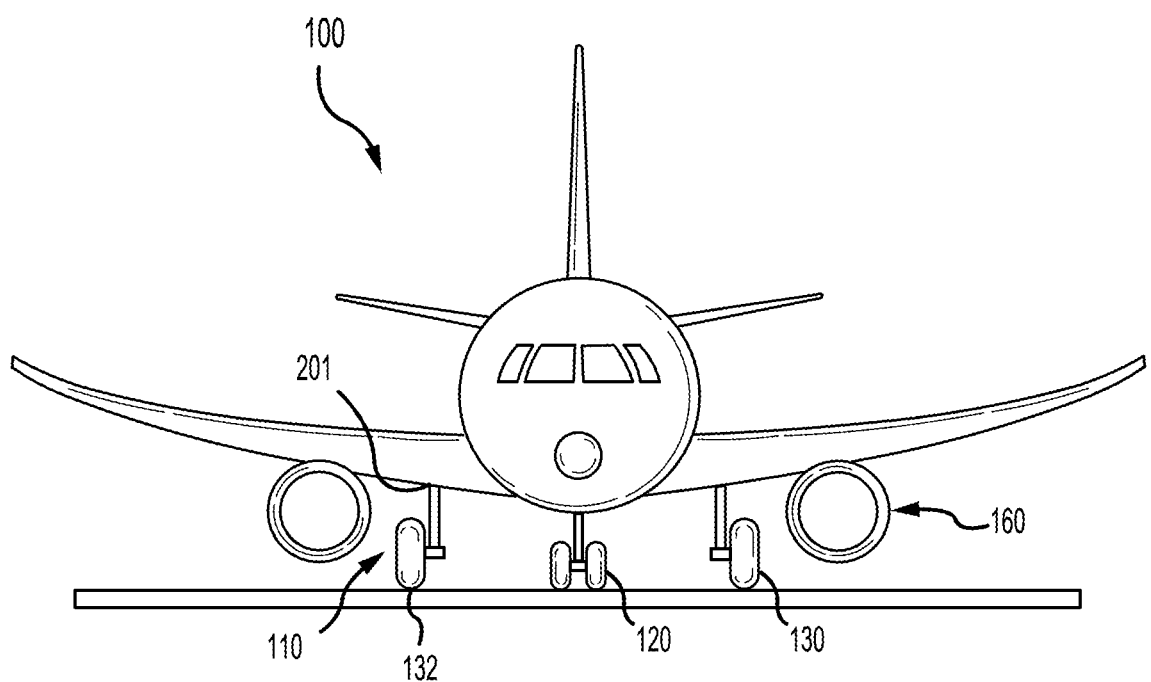
FIG. 1 illustrates an aircraft having multiple landing gear, in accordance with various embodiments.

Referring now to FIG. 1, an aircraft 100 in accordance with various embodiments can include multiple landing gear including a first landing gear 110, a second landing gear 120, and a third landing gear 130. In various embodiments, the first landing gear 110 and the third landing gear 130 may be main landing gear and the second landing gear 120 may be a nose landing gear. Each landing gear may include one or more wheel assemblies. For example, the first landing gear 110 includes a wheel assembly 132. The landing gear 110, 120, 130 and the wheel assembly 132 support the aircraft 100 in response to the aircraft 100 being parked and during taxi, takeoff, and landing of the aircraft 100.

The aircraft 100 may further include one or more power plant 160. The power plant 160 may be controlled by a pilot (such as by controlling a throttle in a cockpit) to generate thrust to accelerate the aircraft 100.

Figures 2A, 2B:
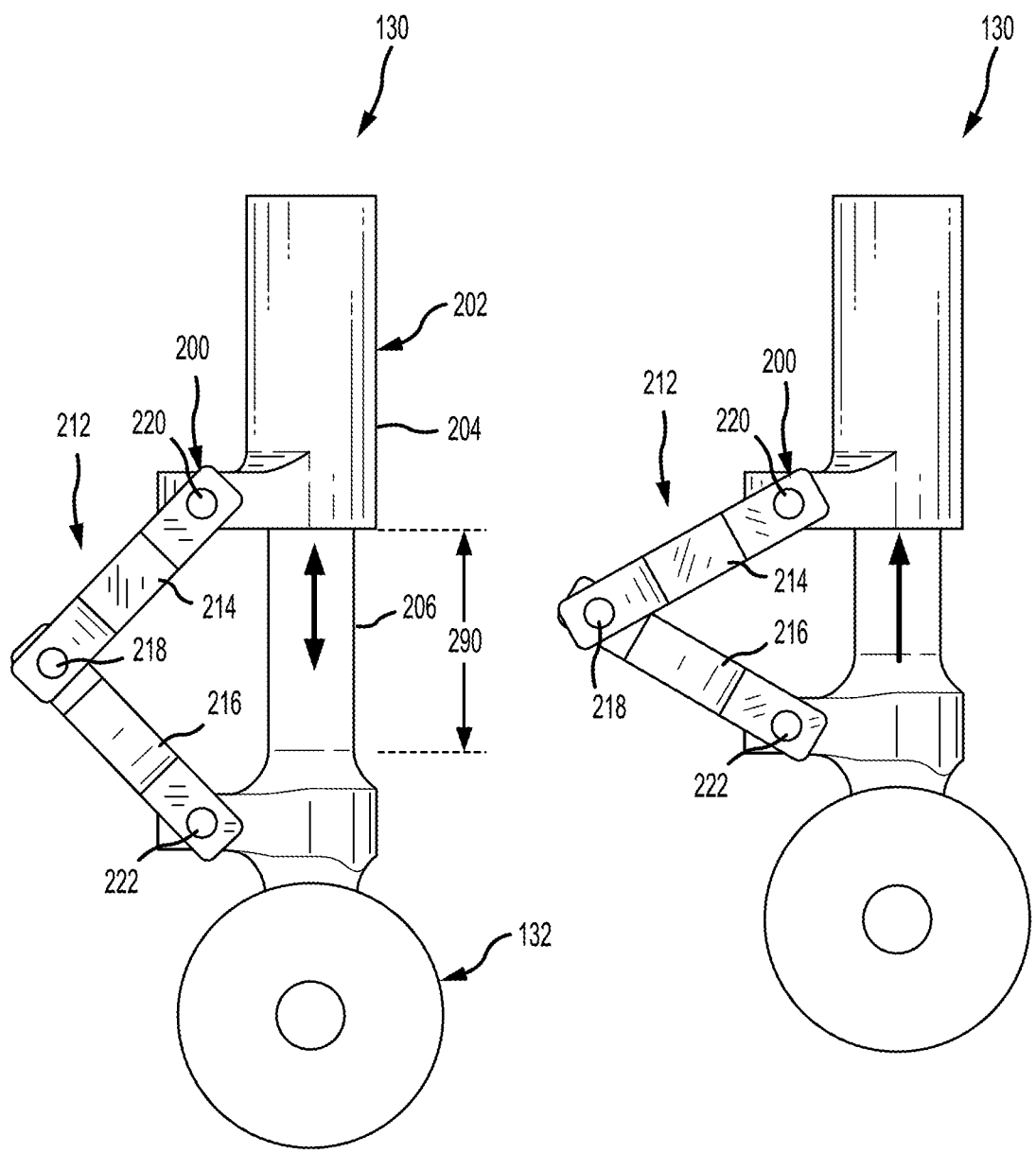
FIG. 2A illustrates a deployed landing gear that includes a system for visually indicating a health of the shock strut, in accordance with various embodiments.
FIG. 2B illustrates the landing gear of FIG. 2A with the shock strut in a compressed position, in accordance with various embodiments.

Referring now to FIGS. 2A and 2B, the landing gear 130 may include a system 200 for visually indicating a health of the landing gear 130. Referring briefly to FIG. 1, FIG. 2A, and FIG. 2B, the landing gear 130 may be coupled to the aircraft 100 via an aircraft attachment 201. Although the system 200 is shown included in the third landing gear 130, a similar system may also or instead be included in one or more of the first landing gear 110 or the second landing gear 120. In various embodiments, each of landing gear 110 and landing gear 130 may include a system 200 of the present disclosure. In this manner, the roll/tilt of the aircraft while on the ground may be determined by indicating the difference in stroke between the landing gear 130 (e.g., left-hand main landing gear) and the landing gear 110 (e.g., right-hand main landing gear).

With reference to FIG. 2A and FIG. 2B, the landing gear 130 includes a shock strut 202 that is designed to absorb a shock experienced by the wheel assembly 132, such as in response to the wheel assembly 132 rolling over a rough runway or in response to a landing event. The shock strut 202 includes a cylinder 204 and a piston 206 designed to at least partially be received by the cylinder 204. In that regard, the piston 206 may translate within and relative to the cylinder 204. The shock strut 202 may further include a mechanism, such as oil, designed to absorb the shock as the piston 206 translates into the cylinder 204.

The landing gear 130 may also include a set of torque arms 212. The torque arms 212 may be coupled to the piston 206 and the cylinder 204 and may resist rotation of the piston 206 relative to the cylinder 204. The torque arms 212 include a first torque arm 214 and a second torque arm 216 pivotally coupled together via a pivot 218. A first end of the first torque arm 214 may be pivotally coupled to cylinder 204 via a pivot 220 and a second end of the first torque arm 214 may be pivotally coupled to the second torque arm 216 (i.e., via the pivot 218). A first end of the second torque arm 216 may be pivotally coupled to piston 206 via a pivot 222 and a second end of the second torque arm 216 may be pivotally coupled to the first torque arm 214 (i.e., via the pivot 218). In this manner, first torque arm 214 rotates with respect to second torque arm 216 (i.e., about pivot 218) in response to the piston 206 translating within and relative to the cylinder 204.

Figure 2C:
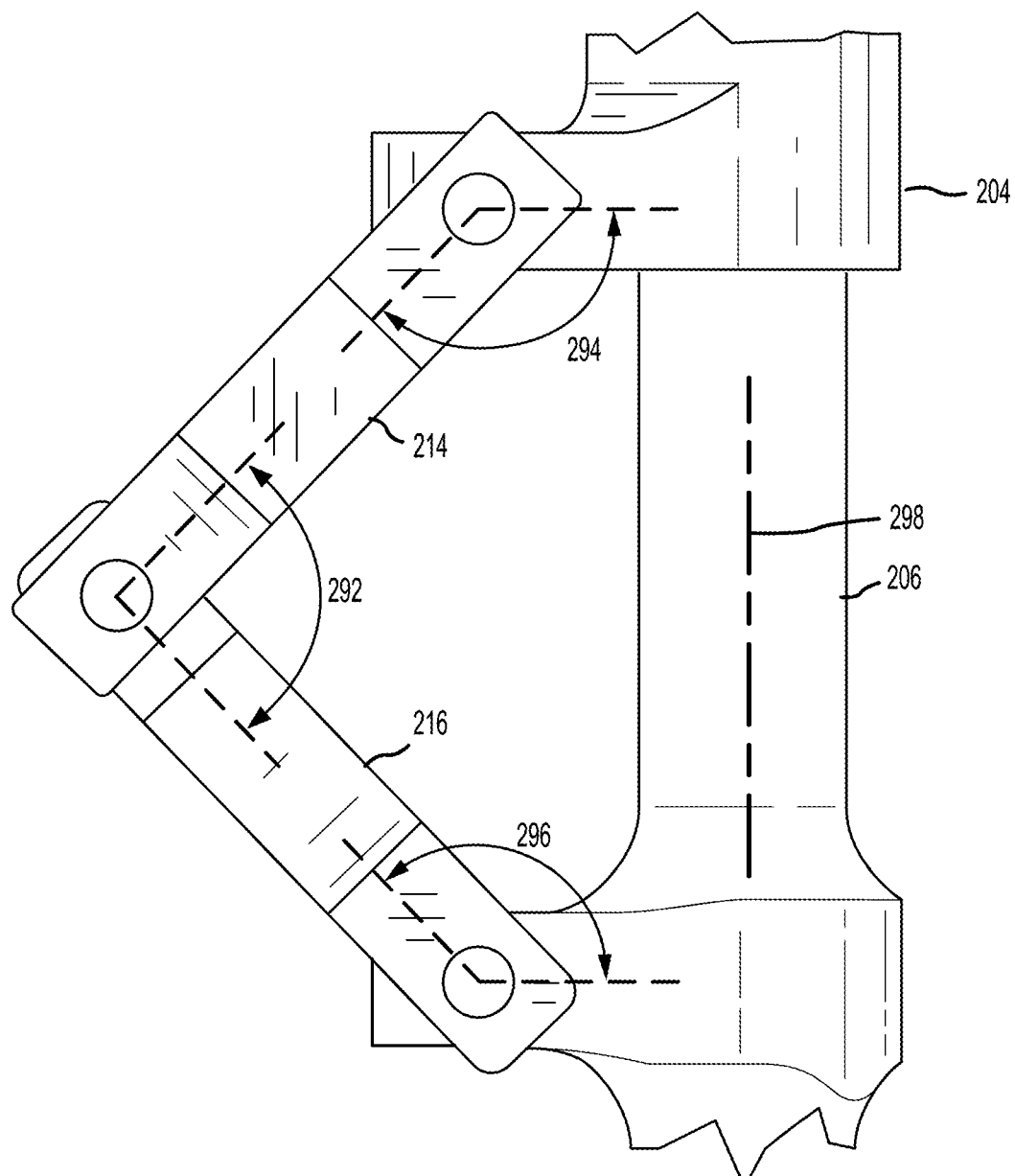
FIG. 2C illustrates the landing gear of FIG. 2A and various pivots and potential locations for mounting the system, in accordance with various embodiments.
Figure 3A:
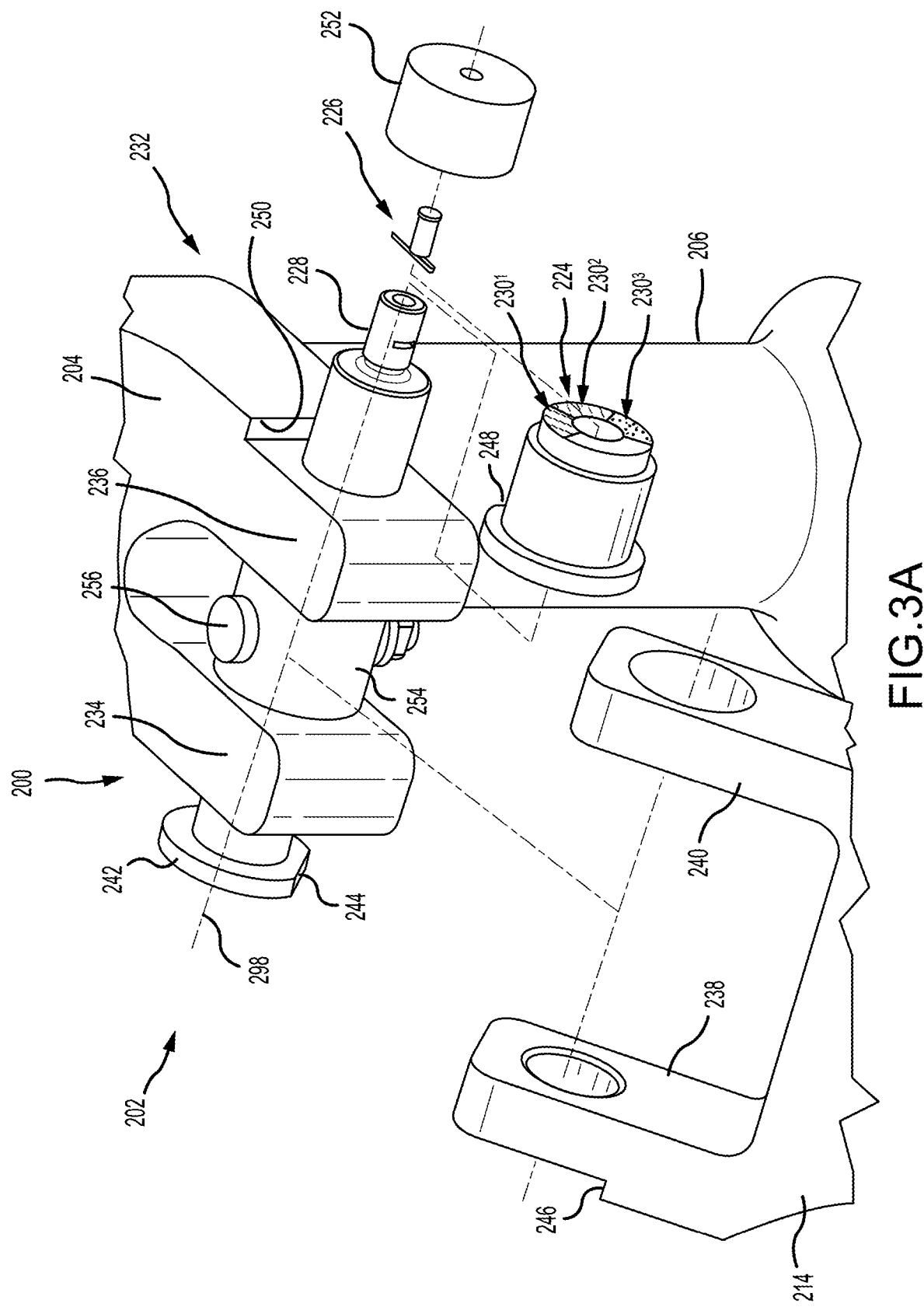
FIG. 3A illustrates an assembly view of the landing gear of FIG. 2A with the system installed at the pivot whereby the upper torque arm mounts to the cylinder, the system comprising a pointer that rotates with the torque arm, in accordance with various embodiments.
Figure 3D:
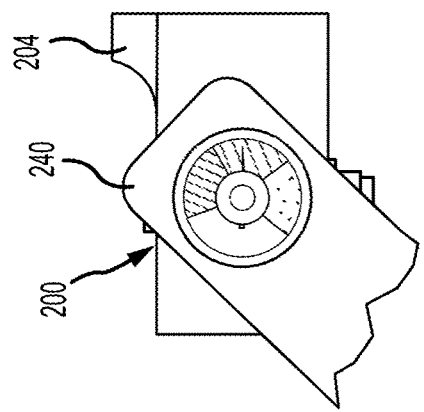
FIG. 3B, FIG. 3C, FIG. 3D, and FIG. 3E illustrate various views of the system of FIG. 3A, in accordance with various embodiments.
Figure 3B:
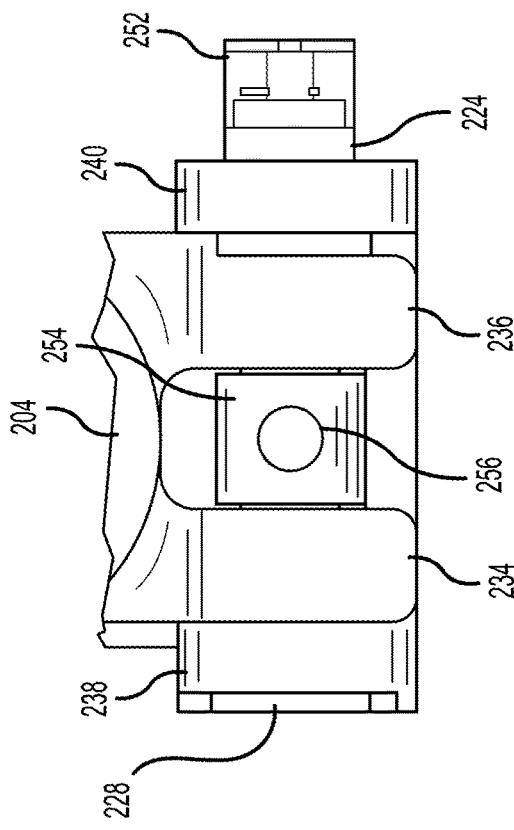
Figure 3E:
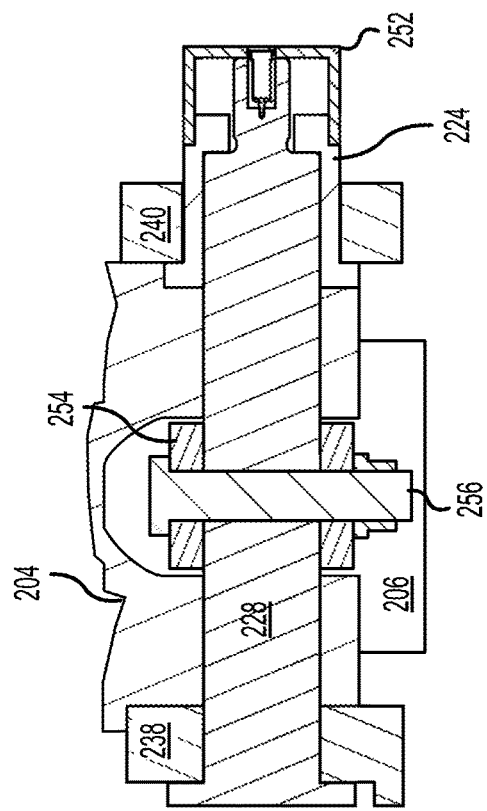
Figure 3C:
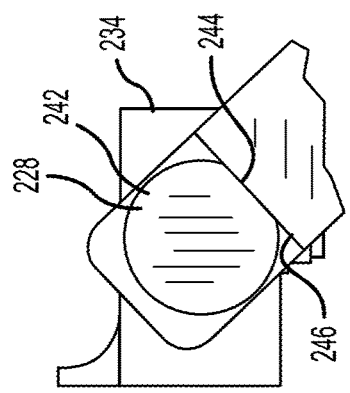

It is desirable to monitor the health of shock strut 202. The health of the shock strut 202 may be affected due to leakage of air and/or oil from the shock strut. As air and/or oil leaks from the shock strut 202, the internal pressure of shock strut 202 may decrease allowing piston 206 to retract into cylinder 204 (see FIG. 2B) from a nominal position. Stated differently, the shock strut stroke 290 may vary depending on the health of the shock strut 202. As previously mentioned, first torque arm 214 rotates with respect to second torque arm 216 (i.e., about pivot 218) in response to the piston 206 translating within and relative to the cylinder 204. Stated differently, and with momentary reference to FIG. 2C, the angle 292 of the first torque arm 214 with respect to the second torque arm 216 is affected by and dependent on the shock strut stroke 290. Likewise, the angle 294 of the first torque arm 214 with respect to the cylinder 204 is affected by and dependent on the shock strut stroke 290. Likewise, the angle 296 of the second torque arm 216 with respect to the piston 206 is affected by and dependent on the shock strut stroke 290.

In this manner, the shock strut stroke 290, and the internal pressure of shock strut 202, may be indirectly monitored by monitoring any one of angle 292, angle 294, or angle 296. In this regard, system 200 may be located at any one of pivot 218, pivot 220, or pivot 222 as desired. It should be understood that, although described herein as mounted to a torque arm connection, the system 200 herein may be mounted to any suitable rotating component (also referred to herein as a first arm) whose angular position corresponds to a shock strut stroke.

With reference to FIG. 3A through FIG. 3E, system 200 is illustrated located at pivot 220. System 200 includes a visual indicator 224 and a pointer 226. The visual indicator 224 and the pointer 226 are readily visible from an exterior of the shock strut. In the illustrated embodiment, pointer 226 is configured to rotate with a pin 228 with respect to visual indicator 224. However, in various embodiments, visual indicator 224 may be the rotating component and pin 228 and therefore pointer 226 may remain stationary with respect to cylinder 204 (e.g., see FIG. 5A through FIG. 5D). In this regard, at least one of the pointer 226 or the visual indicator 224 may be configured to rotate with respect to the other of the pointer 226 or the visual indicator 224 in response to piston 206 translating with respect to cylinder 204.

Visual indicator 224 may comprise a plurality of sectors, such as first sector $230^1$, second sector $230^2$, and third sector $230^3$. Each sector 230 may be disposed on a front surface of the visual indicator, for example by adhering a label to the front surface, by painting the front surface, by etching the front surface, or any other suitable manner of creating a visible label. For example, each sector 230 may comprise a different color (e.g., green for the ideal operating stroke ($230^2$), yellow for a lower stroke ($230^1$), and red for a high stroke ($230^3$)) to readily indicate to a crew member a health of the shock strut. An enlarged front view of the visual indicator 224 is illustrated in FIG. 4B. With momentary reference to FIG. 4A and FIG. 4B, the first sector $230^1$ may correspond to a first range $330^1$ of shock strut strokes (e.g., a fully extended position to a first partially compressed position) corresponding to a first range of aircraft loads (e.g., loads which are less than OEW (operating empty weight)). The second sector $230^2$ may correspond to a second range $330^2$ of shock strut strokes (e.g., the first partially compressed position to a second partially compressed position) corresponding to a second range of aircraft loads (e.g., OEW to MTOW (maximum take-off weight)). The third sector $230^3$ may correspond to a third range $330^3$ of shock strut strokes (e.g., the second partially compressed position to a fully compressed position) corresponding to a third range of aircraft loads (e.g., loads which are greater than MTOW). In this regard, it may be desirable for the shock strut stroke to be within the second range $330^2$, which may indicate ideal oil and gas levels. In the event the pointer 226 indicates the shock strut stroke is within the first range $330^1$, it can be determined that the gas and/or oil levels within shock strut 202 are too high (under the assumption that the aircraft is loaded between OEW and MTOW). In the event the pointer 226 indicates the shock strut stroke is within the third range $330^3$, it can be determined that the gas and/or oil levels within shock strut 202 are too low (also under the assumption that the aircraft is loaded between OEW and MTOW). In this manner, the pointer 226 is configured to point to a sector of the plurality of sectors based upon the stroke of the shock strut 202 (i.e., depending on the position of piston 206 with respect to cylinder 204) to indicate a health (e.g., oil and or gas levels) of the shock strut 202.

With reference to FIG. 3A through FIG. 3E, pointer 226 may be coupled to pin 228. Pin 228 may extend through a lug or similar mounting feature 232 of cylinder 204. Mounting feature 232 may comprise a lug whereby the torque arm 214 is pivotally mounted to cylinder 204. Mounting feature 232 may comprise a first tab 234 extending from cylinder 204 and a second tab 236 extending from cylinder 204. Pin 228 may extend through first tab 234 and second tab 236. In this regard, first tab 234 and second tab 236 may each comprise a through hole axially aligned with one another through which pin 228 extends.

In various embodiments, first torque arm 214 splits into two fingers that define an end of first torque arm 214. In this regard, first torque arm 214 may comprise a first finger 238 and a second finger 240. Pin 228 may extend through first finger 238 and a second finger 240 when first torque arm 214 is in the installed position. In this regard, first finger 238 and a second finger 240 may each comprise a through hole axially aligned with one another through which pin 228 extends. In the installed position, the through holes of first tab 234 and second tab 236 and the through holes of first finger 238 and a second finger 240 may be axially aligned.

In various embodiments, pin 228 comprises a flange 242 disposed at an end thereof. Flange 242 may comprise a contact surface 244 configured to contact a contact surface 246 of first finger 238 of first torque arm 214. A torsion force may be transferred from first torque arm 214 to pin 228 via contact surface 246 and contact surface 244 in response to first torque arm 214 rotating with respect to cylinder 204. In this manner, pin 228 is configured to rotate together with first torque arm 214 with respect to the cylinder 204. As first torque arm 214 rotates in response to reciprocating motion of piston 206 with respect to cylinder 204, the first torque arm 214 causes pin 228 to rotate together with the first torque arm 214. Because the pointer 226 is mounted to pin 228, pointer 226 rotates together with the pin 228. The visual indicator 224 is mounted to pin 228, but mechanically locked to the cylinder 204 such that the visual indicator 224 does not rotate with the pin 228 (i.e., remains stationary with respect to the cylinder 204). The visual indicator 224 is rotated during installation such that the first sector $230^1$, second sector $230^2$, and third sector $230^3$ correspond to the appropriate position of piston 206 with respect to cylinder 204 (i.e., stroke) as described with respect to FIG. 4A and FIG. 4B. In this manner, should the oil and/or gas levels be outside a desired envelope, the system 200 (i.e., visual indicator 224 and pointer 226) will provide a visual indication to ground crew indicating such levels to indicate the health of the shock strut.

In various embodiments, and similar to contact surface 244, visual indicator 224 may likewise comprise a contact surface 248. In various embodiments, and similar to contact surface 246, cylinder 204 may likewise comprise a contact surface 250. Visual indicator 224 may comprise a cylindrical member (e.g., in the form of a bushing) configured to be placed over pin 228 and to extend through the through hole of second finger 240. Visual indicator 224 may comprise a bore through which the pin 228 extends. To prevent visual indicator 224 from rotating with first torque arm 214 (and pointer 226), visual indicator 224 may be mechanically locked from rotation with respect to cylinder 204 via contact surface 248 and contact surface 250. In this regard, contact surface 248 may be configured to prevent the visual indicator 224 from rotating with the pointer 226.

In various embodiments, system 200 further comprises a transparent cover 252 configured to be placed over a portion of visual indicator 224. In various embodiments, transparent cover 252 is threadingly coupled to visual indicator 224. Pointer 226 may be at least partially enclosed by transparent cover 252. System 200 may be protected from foreign elements by transparent cover 252. The visual indicator 224 is visible through the transparent cover 252.

In various embodiments, system 200 may further comprise a spacer 254 located between first tab 234 and second tab 236. Pin 228 may extend through spacer 254. In this regard, spacer 254 may be configured to receive pin 228. A fastener 256 may extend through spacer 254 and pin 228 to secure the spacer 254 to the pin 228. In this manner, the spacer 254 may be configured to stop the pin 228 from axial movement (i.e., along the axis 298 of pin 228).

With respect to FIG. 5A through FIG. 5D, elements with like element numbering, as depicted in FIG. 3A through FIG. 3E, are intended to be the same, unless otherwise indicated, and will not necessarily be repeated for the sake of clarity.

With reference to FIG. 5A through FIG. 5D, a system 400 is illustrated in accordance with various embodiments. System 400 may be similar to system 200 (see FIG. 3A), except that in system 400 the visual indicator 424 rotates with the first torque arm 414 and the pointer 426 remains stationary with respect to the cylinder 404. In various embodiments, visual indicator 424 may comprise a contact surface 448. In various embodiments, first torque arm 414 may likewise comprise a contact surface 446. A torsion force may be transferred from first torque arm 414 to visual indicator 424 via contact surface 446 and contact surface 448 in response to first torque arm 414 rotating with respect to cylinder 404. In this manner, visual indicator 424 is configured to rotate together with first torque arm 414 with respect to the cylinder 404. In contrast, pointer 426 may not rotate with first torque arm 414. Instead, pointer 426 may be mounted to pin 428. The pin 428 may be mechanically locked from rotation with respect to cylinder 404. For example, spacer 454 may comprise a contact surface 458 configured to contact cylinder 404 to prevent rotation of pin 428 with respect to cylinder 404. In this manner, visual indicator 424 may be configured to rotate together with first torque arm 414 with respect to the cylinder 404 and the pointer 426 as piston 406 translates with respect to cylinder 404. In this manner, visual indicator 424 may be configured to rotate together with first torque arm 414 with respect to the pointer 426.

Figure 7A:
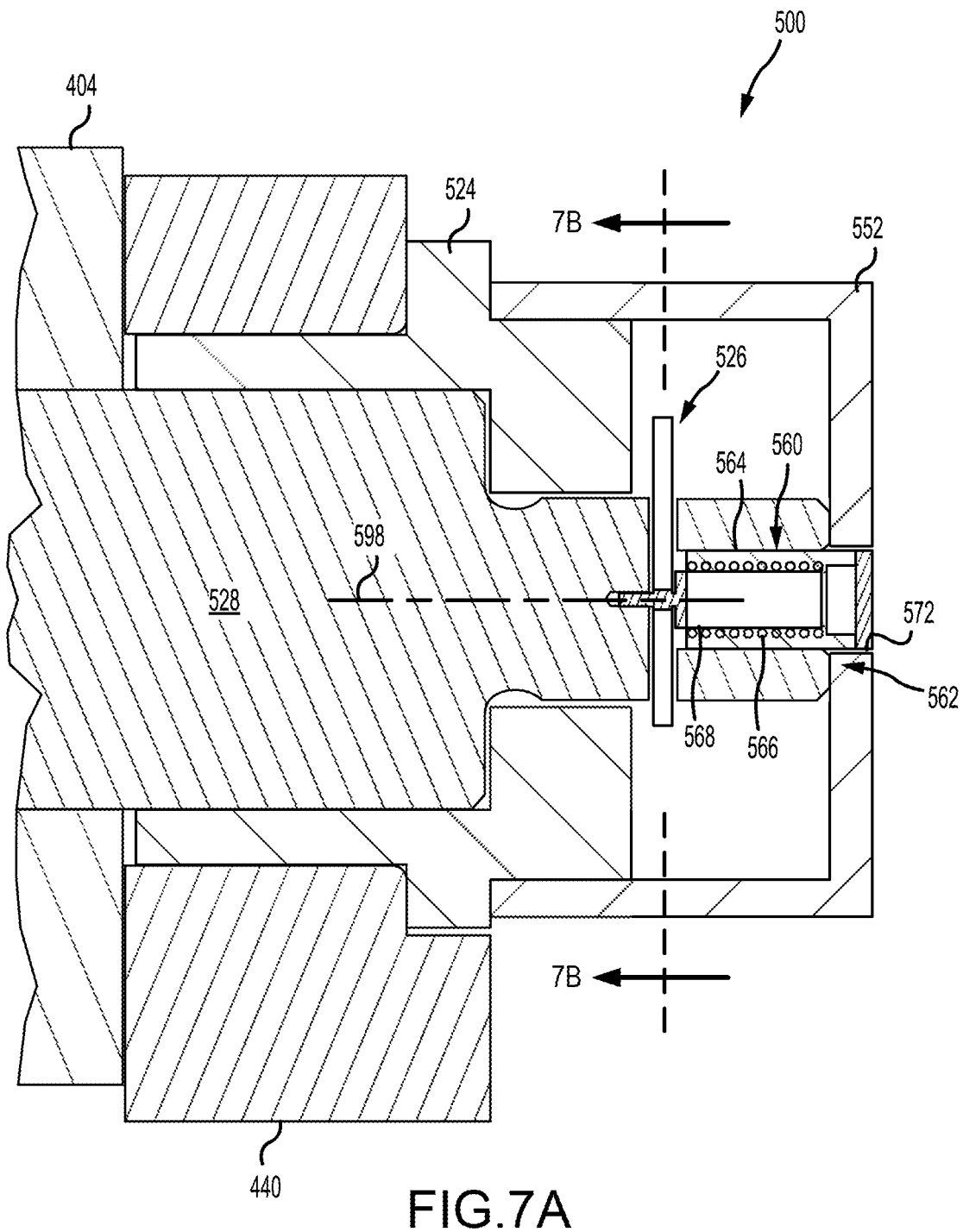
FIG. 7A illustrates a section view of a system for visually indicating a health of the shock strut, the system including a temperature sensitive material for active temperature compensation, in accordance with various embodiments.
Figure 7B:
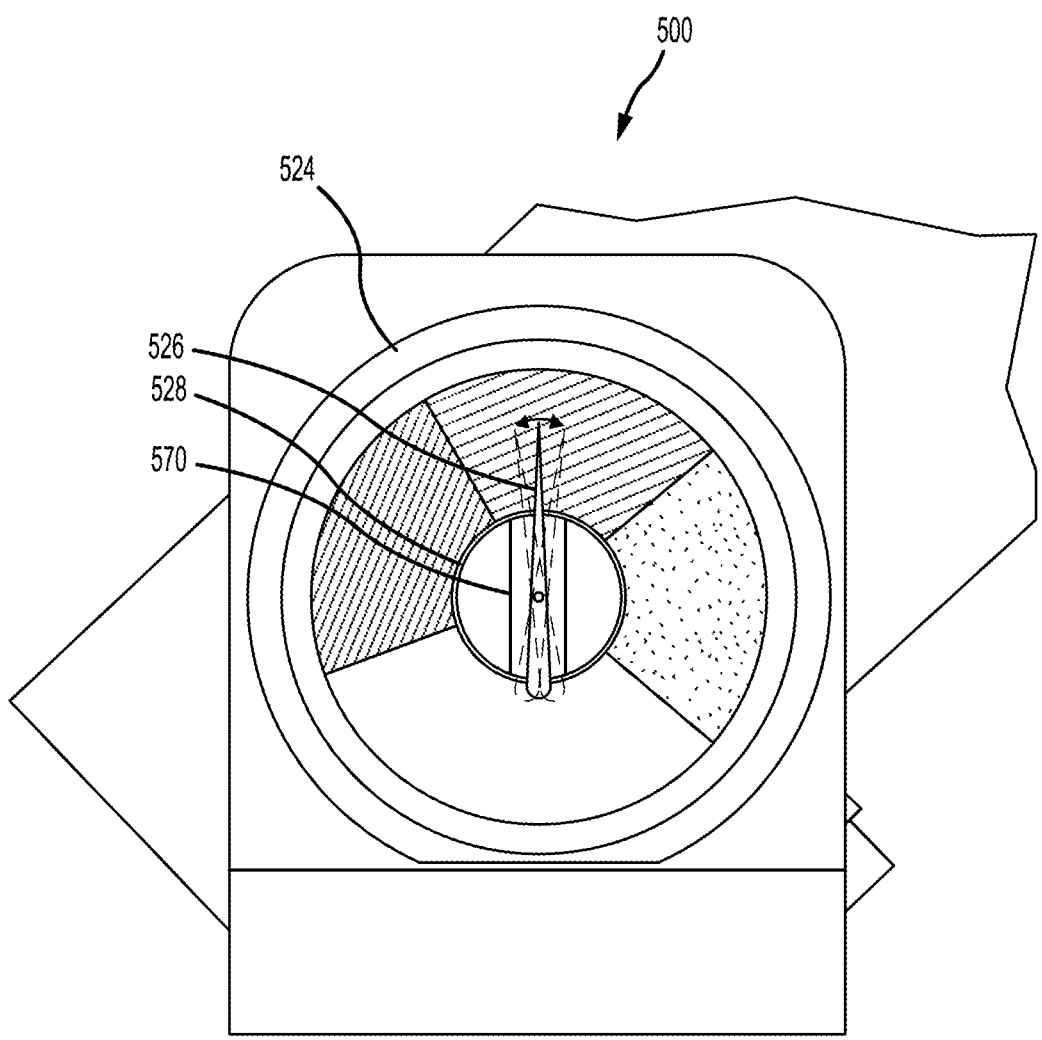
FIG. 7B illustrates a front view of the visual indicator of the system of FIG. 7A, including various temperature compensating rotational positions for the pointer, in accordance with various embodiments.

With reference to FIG. 7A and FIG. 7B, a system 500 is illustrated with built-in, active temperature compensation. System 500 includes visual indicator 524, pointer 526, and a temperature compensating pointer assembly 560. Pointer assembly 560 may be mounted to pin 528. In various embodiments, pointer assembly 560 is received into an end 562 of pin 528. Pointer assembly 560 and pin 528 may be coaxially aligned with axis 598. Pointer assembly 560 may comprise a temperature sensitive material (e.g., a bi-metallic helical coil) configured to cause the pointer 526 to rotate with respect to the visual indicator 524 beyond that of the rotation caused by the stroke to provide a temperature compensated reading of the pointer 526. Pointer assembly 560 may comprise a pointer case 564, a helical coil 566, and a spindle 568. Spindle 568 may be mounted to pointer case 564. Pointer case 564 may be press fit into end 562 of pin 528. Pointer case 564 may be threadingly coupled to end 562 of pin 528. The helical coil 566 may be coupled between the pointer case 564 and the spindle 568. The helical coil 566 may be made from a temperature sensitive material (e.g., a bi-metallic coil) that responds to temperature changes and rotates the spindle 568 with respect to the pointer case 564 (and the visual indicator 524) to indicate a temperature compensated reading of the pointer 526. Transparent cover 552 may comprise an aperture 572 through which pointer case 564 extends. In this manner, pointer case 564 may be directly exposed to ambient air for accurate temperature compensation.

In various embodiments, pin 528 comprises a slot 570 (also referred to herein as a pin slot) through which the pointer 526 extends which allows temperature compensating rotation of pointer 526 with respect to pin 528. In this manner, pointer 526 may be calibrated to accurately indicate a health of the shock strut including with temperature compensation.

Figure 8:
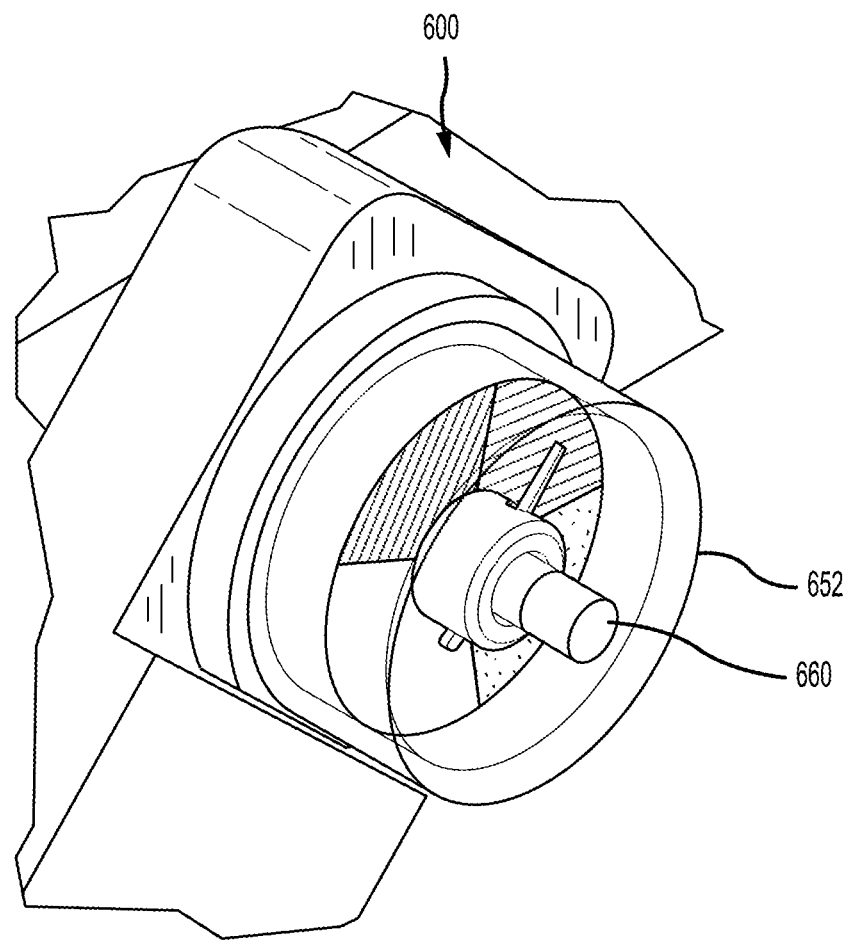
FIG. 8 illustrates a perspective view of a system for visually indicating a health of the shock strut, including a temperature compensating pointer assembly which extends from a transparent cover to be exposed to ambient air, in accordance with various embodiments.

With reference to FIG. 8, a system 600 is illustrated comprising a temperature compensating pointer assembly 660 which extends from the transparent cover 652. In this manner, a larger portion of pointer assembly 660 may be directly exposed to ambient air. In various embodiments, the pointer assembly 560 of system 500 (see FIG. 7A and FIG. 7B) extends from the transparent cover 552, similar to pointer assembly 660.

Figure 9:
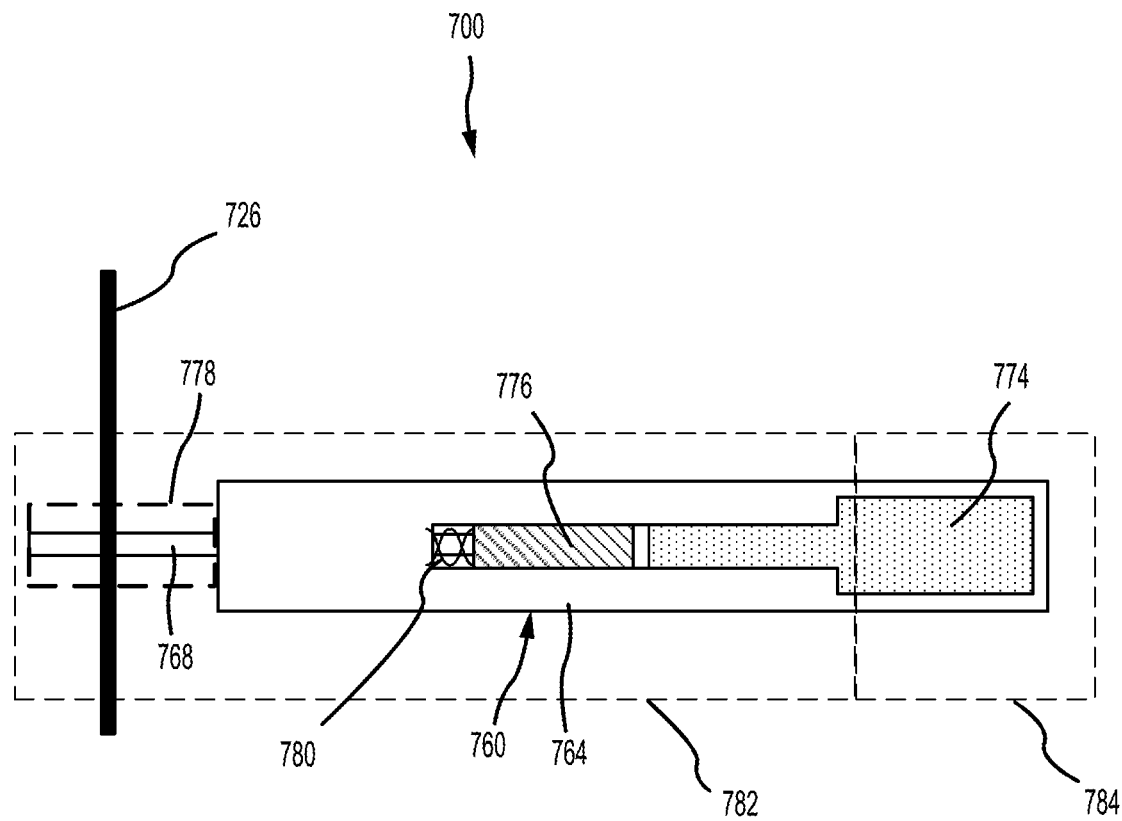
FIG. 9 illustrates a schematic view of a system for visually indicating a health of the shock strut, the system including a temperature sensitive material for active temperature compensation, in accordance with various embodiments.

With reference to FIG. 9, a schematic illustration of a system 700 is illustrated with built-in temperature compensation. In various embodiments, system 600 (see FIG. 8) is similar to system 700. System 700 includes a pointer 726 and a temperature compensating pointer assembly 760. Pointer assembly 760 may comprise a temperature sensitive material 774 (e.g., a temperature sensitive fluid) configured to cause the pointer 726 to rotate with respect to the visual indicator 524 to provide a temperature compensated reading of the pointer 726 to indicate shock strut health. Pointer assembly 760 may comprise a pointer case 764, a spindle 768, and a temperature sensitive material 774 contained within the pointer case. The temperature sensitive material 774 may comprise a fluid configured to expand and contract depending on the ambient temperature. As the temperature sensitive material 774 expands, the temperature sensitive material 774 biases the spindle 768 to extend from pointer case 764 (i.e., to translate away from the temperature sensitive fluid 774). A diaphragm 776, such as a metal bellow for example, may be coupled to the spindle 768 to seal the temperature sensitive material 774 within pointer case 764 and provide a surface onto which the temperature sensitive material 774 acts to translate the spindle 768 with respect to pointer case 764. As the spindle 768 translates away from the temperature sensitive material 774, the spindle 768 contacts a cam body 778 which converts the translating motion of spindle 768 (which is allowed only axial motion) into rotational motion of the cam body 778 (which is allowed only rotational motion). The pointer 726 may be mounted to the cam body 778 and rotate therewith. In further embodiments, it is contemplated herein that the pointer 726 may be mounted to the spindle 768 and the translating motion of spindle 768 may be converted into rotational motion of the spindle 768 (i.e., the cam body remains stationary as the spindle 768 translates and rotates). A spring element 780 may be located between pointer case 764 and diaphragm 776 to provide a return force for the spindle 768 as the temperature sensitive material 774 contracts with a change in temperature. Spring element 780 may comprise any suitable spring configured to bias the diaphragm 776 toward the temperature sensitive material 774. In this regard, temperature sensitive material 774 may expand to translate diaphragm 776 against the bias of spring element 780. The amount of translation of spindle 768 and consequent rotation thereof may be calibrated to correspond to the change in volume of the gas and/or oil within the shock strut to provide a temperature compensated reading of the shock strut health. Similarly, the type of temperature sensitive material 774 may be chosen to correspond to the change in volume of the gas and/or oil within the shock strut to provide a temperature compensated reading of the shock strut health. In this regard, the size (e.g., volume and/or diameter) of the pointer case 764 interior and the type of temperature sensitive material 774 may be variables to consider when calibrating the system 700.

Figures 10, 11:
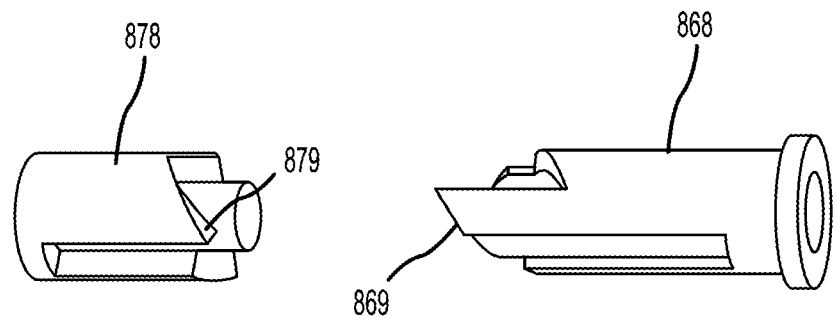
FIG. 10 and FIG. 11 illustrate perspective views of an exemplary cam body and an exemplary spindle, respectively, for the system of FIG. 9, in accordance with various embodiments.

With reference to FIG. 10, an exemplary cam body 878 is illustrated in accordance with various embodiments. In various embodiments, cam body 778 of FIG. 9 may be similar to cam body 878. Cam body 878 may comprise a cam surface 879 configured to convert linear motion into rotational motion.

With reference to FIG. 11, an exemplary spindle 868 is illustrated in accordance with various embodiments. In various embodiments, spindle 768 of FIG. 9 may be similar to spindle 868. Spindle 868 may comprise a cam surface 869 configured to convert linear motion into rotational motion together with the cam body 878 (see FIG. 10).

With reference to FIG. 12, a front face of a visual indicator 924 is illustrated, in accordance with various embodiments. Any of the visual indicators of the present disclosure may be similar to visual indicator 924. Visual indicator 924 may comprise a plurality of concentric rings, each ring corresponding to a different temperature range. The illustrated embodiments depicts three concentric rings, though any number of rings may be provided as desired. Each ring corresponds to a different temperature range. In various embodiments, each ring is painted onto the surface of visual indicator 924 using a thermal sensitive paint, such as a thermo-chromic paint for example. The thermal sensitive paint for each ring may be slightly different so as to react to the temperature range of the respective ring. In this manner, when the ambient temperature is within the temperature range of a particular ring, said ring may change color, indicating visually that the ambient temperature corresponds to the temperature range of said ring. In this manner, an operator may read visual indicator 924 without having to separately measure ambient temperature. However, depending on the particular design, visual indicator 924 may also be made without thermal sensitive paint and the ambient temperature separately measured as desired.

Figure 4A:
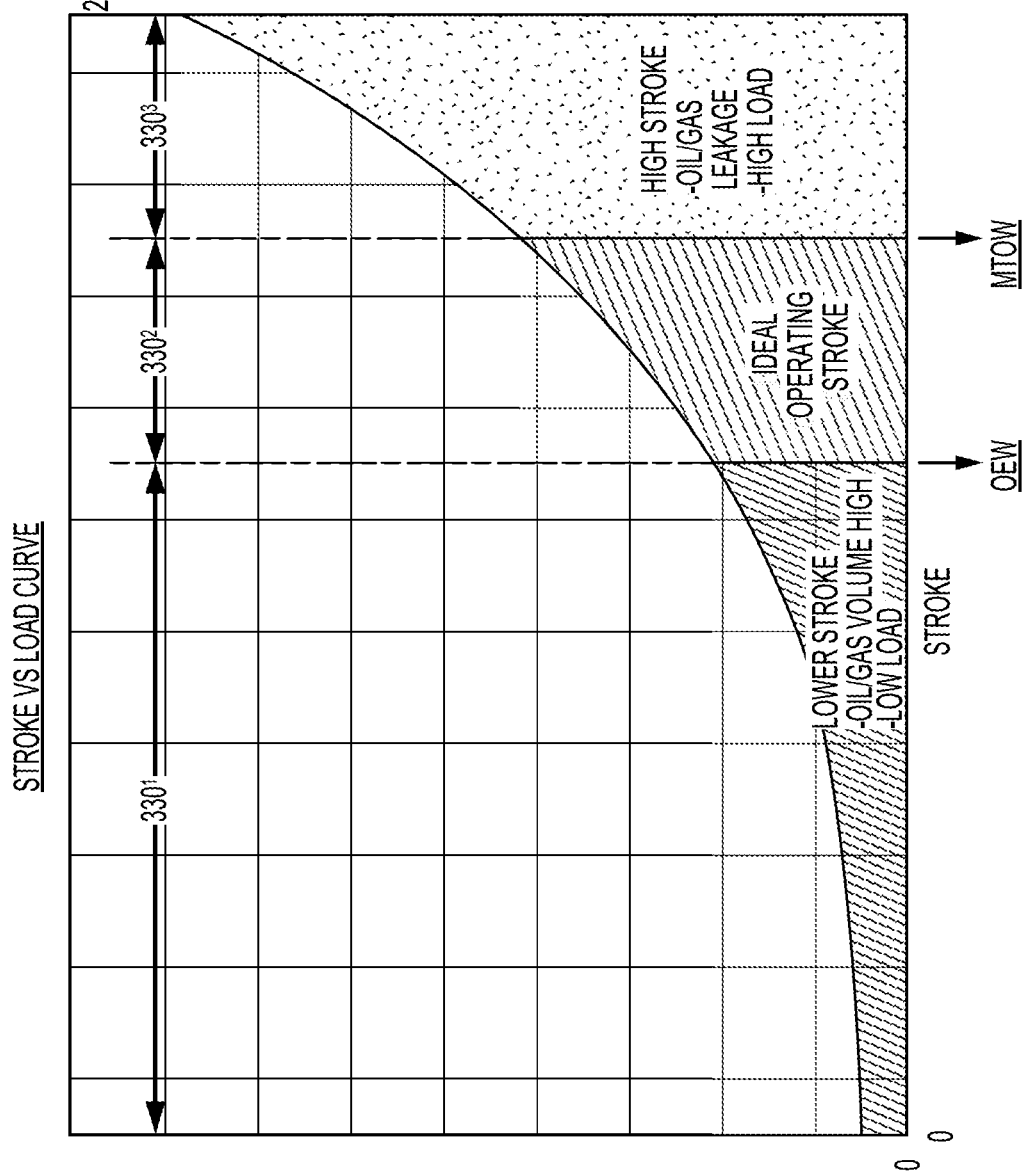
FIG. 4A illustrates a stroke versus load curve which corresponds to different sectors of a visual indicator of a system for visually indicating a health of the shock strut, in accordance with various embodiments.
Figure 4B:
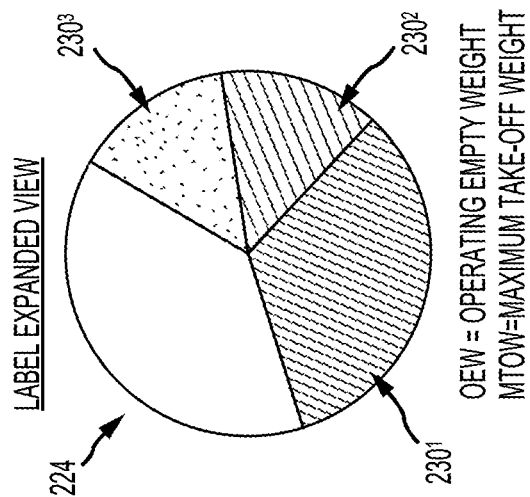
FIG. 4B illustrates an exemplary front face label for a visual indicator which corresponds to the curve of FIG. 4A, in accordance with various embodiments.
Figure 6:
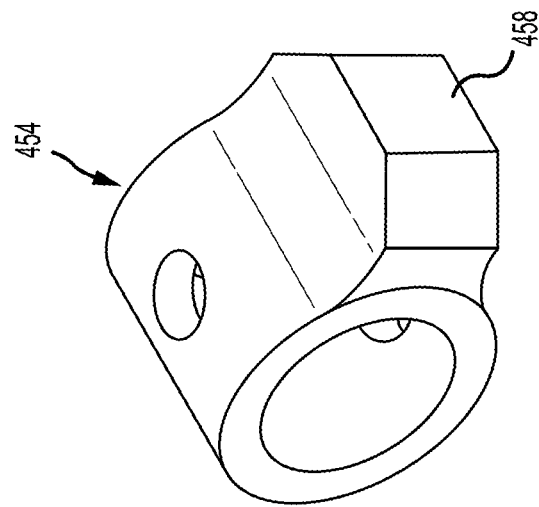
FIG. 6 illustrates an exemplary spacer having an anti-rotation stopping surface for the system of FIG. 5A, in accordance with various embodiments.
Figure 5C:
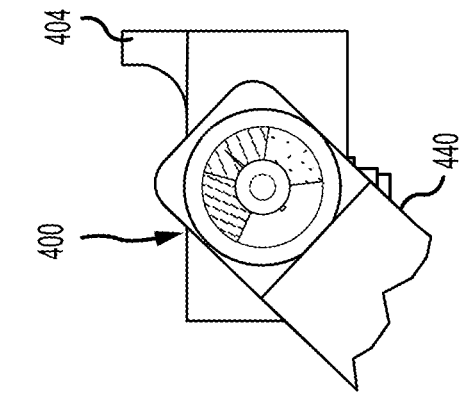
FIG. 5B, FIG. 5C, and FIG. 5D illustrate various views of the system of FIG. 5A, in accordance with various embodiments.
Figure 5B:
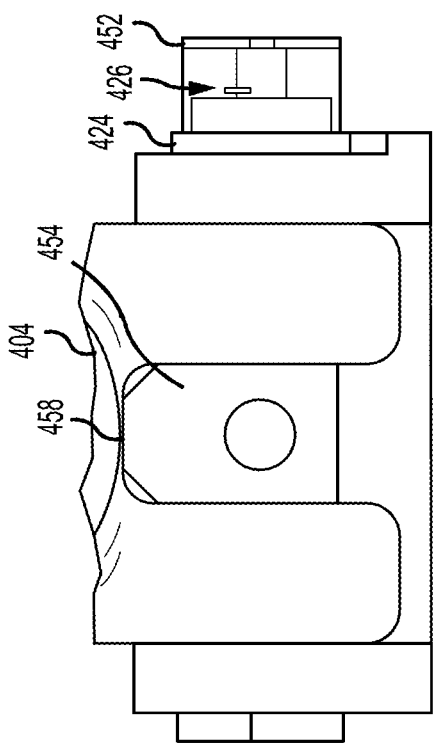
Figure 5D:
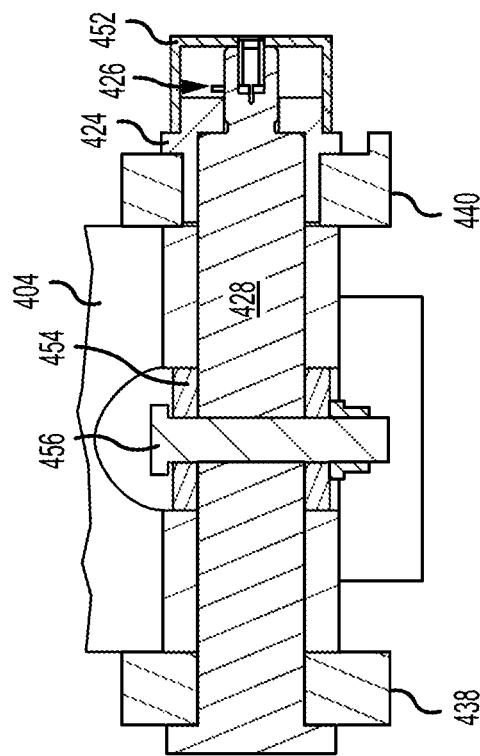

Additionally, each ring may be separated into a plurality of stroke ranges, for example as discussed with respect to FIG. 4A and FIG. 4B. S2 may denote the ideal stroke at a nominal temperature range and may be used as a zero point for calibrating the other temperature ranges. With momentary reference to FIG. 13, a table is provided, the rows of which correspond to each ring of visual indicator 924. An increase in temperature may cause shock strut extension (e.g., as the gas and/or oil expands with temperature). In the illustrated embodiment, shock strut extension co-relates to a counter clockwise turn of visual indicator 924. Therefore, the higher temperature ranges may have rings calibrated to be slightly rotated clockwise to the nominal temperature range to compensate for the counter clockwise rotation of the visual indicator 924 due to the increase in temperature. Conversely, the lower temperature ranges may have rings calibrated to be slightly rotated counter clockwise to the nominal temperature range. In this regard, a visual indicator of the present disclosure may provide a visual indicator of the ideal stroke based on temperature. Visual indicator 924 may be used without a temperature compensating pointer assembly, since the temperature compensation is performed with the visual indicator 924. A crew member may measure the ambient temperature and determine shock strut health by looking at the location of the pointer with respect to the appropriate ring which corresponds to the measured ambient temperature.

Figures 14, 15:
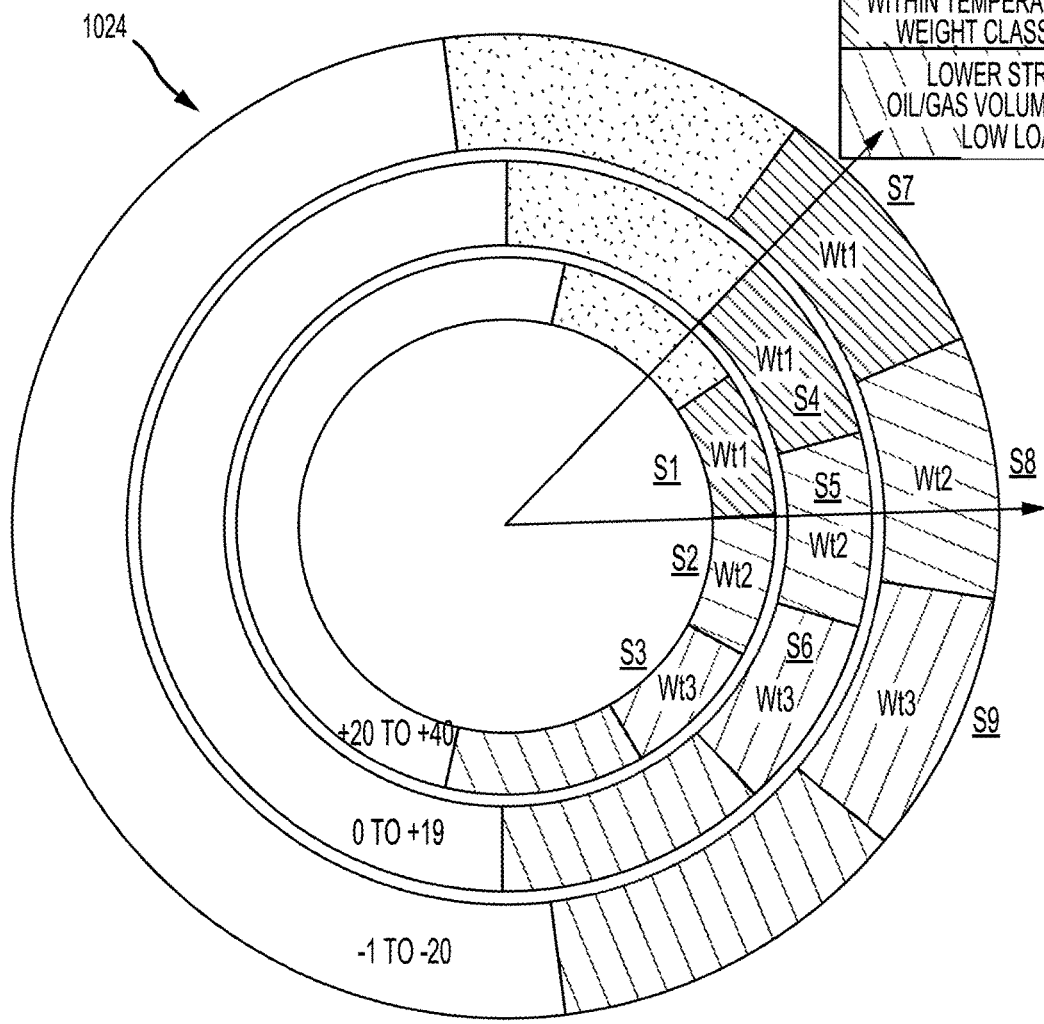
FIG. 14 illustrates an exemplary front face label for a visual indicator which includes a plurality of rings, each corresponding to a load versus stroke curve for a different temperature range, and the ideal stroke sector divided into different weight-dependent sub-sectors, in accordance with various embodiments.
FIG. 15 illustrates a table including a temperature range and a stroke range for different weight classes, the table data corresponding to the different sectors of the visual indicator of FIG. 14, in accordance with various embodiments.

With reference to FIG. 14, a front face of a visual indicator 1024 is illustrated, in accordance with various embodiments. Any of the visual indicators of the present disclosure may be similar to visual indicator 1024. Visual indicator 1024 may be similar to visual indicator 924 of FIG. 12, except that the ideal operating stroke is further subdivided into sectors (S4, S5, and S6) of decreasing weight class. S4 may be the stroke corresponding to a heavier weight class, S5 may be the stroke corresponding to a lighter weight class, and S6 may be the stroke corresponding to yet an even lighter weight class. With momentary reference to FIG. 15, a table (such as those provided as shock strut servicing placards) is provided whose rows correspond to each ring of visual indicator 1024. An increase in temperature may cause shock strut extension (e.g., as the gas and/or oil expands with temperature). Thus, similar to visual indicator 924, the higher temperature indicator ring is thus calibrated to be located slightly clockwise with respect to the lower temperature indicator rings to compensate for the counter-clockwise rotation of the visual indicator 1024 (or clockwise rotation of the pointer) due to shock strut extension as a result of an increase in temperature. Conversely, the lower temperature indicator ring is calibrated to be located slightly counter clockwise with respect to the higher temperature indicator rings. Visual indicator 1024 may be used without a temperature compensating pointer assembly, since the temperature compensation is performed with the visual indicator 1024. A crew member may measure the ambient temperature and determine shock strut health by looking at the location of the pointer with respect to the appropriate ring which corresponds to the measured ambient temperature as well as the appropriate current weight of the aircraft (i.e., depending on amount of cargo, passengers, fuel, etc.). Thus, a shock strut may be considered healthy only if the pointer points to the appropriate weight class in the appropriate ambient temperature ring.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for use with a shock strut, the system comprising:
   a visual indicator which is visible from an exterior of the shock strut;
   a pointer, wherein at least one of the pointer or the visual indicator is configured to rotate with respect to the other of the pointer or the visual indicator in response to a piston of the shock strut translating with respect to a cylinder of the shock strut; and
   a pin, the visual indicator comprises a bushing configured to be placed over the pin, and the pointer is configured to be mounted to the pin, wherein at least one of:
      the pin is configured to be received by a torque arm whereby the torque arm is mounted to a cylinder of the shock strut; or
      the pin comprises a slot configured to accommodate temperature compensating rotation of the pointer.

2. The system of claim 1, wherein the visual indicator comprises at least one of:
   a plurality of sectors, wherein the pointer is configured to point to a sector of the plurality of sectors based upon a stroke of the shock strut to indicate a health of the shock strut; or
   a plurality of concentric rings, each corresponding to a different ambient temperature, and each comprising a plurality of sectors corresponding to a different weight supported by the shock strut.

3. The system of claim 1, further comprising a spacer configured to receive the pin, wherein the spacer is configured to stop the pin from at least one of an axial movement or a rotational movement.

4. The system of claim 1, further comprising a transparent cover configured to be coupled to the visual indicator to at least partially enclose the pointer, and the visual indicator is visible through the transparent cover.

5. The system of claim 1, wherein the visual indicator comprises a plurality of concentric rings, each corresponding to a different ambient temperature, wherein a ring of the plurality of concentric rings comprises a thermal sensitive paint configured to change color when an ambient temperature is within a temperature range of the ring to indicate visually that the ambient temperature corresponds to the temperature range of the ring.

6. A system for use with a shock strut, the system comprising:
   a pin;
   a visual indicator comprising a plurality of sectors, wherein the visual indicator is visible from an exterior of the shock strut;
   a pointer configured to rotate with respect to the visual indicator to point to one of the plurality of sectors;
   a pointer case;
   a spindle mounted to the pointer case; and
   a temperature sensitive material contained within the pointer case, wherein the temperature sensitive material is configured to move in response to a change in temperature to cause the pointer to rotate with respect to the visual indicator.

7. The system of claim 6, wherein the pin is configured to be received by a torque arm whereby the torque arm is mounted to a cylinder of the shock strut.

8. The system of claim 6, wherein the pin comprises a pin slot configured to accommodate temperature compensating rotation of the pointer.

9. The system of claim 8, wherein the pointer is configured to be mounted through the pin slot and the pointer case is configured to be mounted to the pin.

10. The system of claim 6, wherein the temperature sensitive material comprises a bi-metallic coil, wherein the bi-metallic coil is configured to cause the spindle to rotate in response to the change in temperature, and the pointer rotates with the spindle.

11. The system of claim 6, wherein the temperature sensitive material comprises a fluid, wherein the fluid is configured to expand to translate the spindle with respect to the pointer case in response to a change in temperature, and the pointer is configured to rotate in response to the spindle translating with respect to the pointer case.

12. The system of claim 11, further comprising a cam body, wherein at least one of:
   the cam body translates linear motion of the spindle into rotational motion of the cam body, and the pointer rotates with the cam body with respect to the visual indicator; or
   the cam body translates linear motion of the spindle into rotational motion of the spindle, and the pointer rotates with the spindle with respect to the visual indicator.

13. The system of claim 12, further comprising a spring element configured to provide a return force for the spindle as the fluid contracts in response to the change in temperature.

14. The system of claim 6, further comprising a transparent cover coupled to the visual indicator and at least partially enclosing the pointer.

15. The system of claim 14, wherein the pointer case extends from the transparent cover and is exposed to an ambient air.

16. A shock strut comprising:
   a cylinder;
   a piston configured to be at least partially received by the cylinder;
   a torque arm coupled between the cylinder and the piston via a pivot;
   a visual indicator disposed at the pivot, wherein the visual indicator is visible from an exterior of the shock strut;
   a pointer, wherein at least one of the pointer or the visual indicator is configured to rotate with respect to the other of the pointer or the visual indicator in response to the piston translating with respect to the cylinder; and
   a pin, the visual indicator comprises a bushing configured to be placed over the pin, and the pointer is configured to be mounted to the pin, wherein at least one of:
      the pin is configured to be received by a torque arm whereby the torque arm is mounted to a cylinder of the shock strut; or
      the pin comprises a slot configured to accommodate temperature compensating rotation of the pointer.

17. The shock strut of claim 16, wherein the torque arm is configured to rotate with respect to at least one of the cylinder or the piston in response to the piston translating with respect to the cylinder, and the at least one of the pointer or the visual indicator is configured to rotate together with the torque arm.

18. The shock strut of claim 16, wherein the visual indicator comprises a contact surface configured to prevent the visual indicator from rotating with the pointer.

19. The shock strut of claim 16, wherein the pivot comprises a pin, and the pointer is mounted to the pin.

\* \* \* \* \*